(12) United States Patent
Tsai

(10) Patent No.: US 8,467,156 B2
(45) Date of Patent: Jun. 18, 2013

(54) POWER PROTECTION CIRCUIT

(75) Inventor: Hsiao-Jen Tsai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 415 days.

(21) Appl. No.: 12/882,150

(22) Filed: Sep. 14, 2010

(65) Prior Publication Data

US 2012/0033333 A1 Feb. 9, 2012

(30) Foreign Application Priority Data

Aug. 4, 2010 (CN) .......................... 2010 1 0245124

(51) Int. Cl.
*H02H 3/00* (2006.01)
(52) U.S. Cl.
USPC ................................................................ 361/18
(58) Field of Classification Search
USPC .............................................................. 361/18
See application file for complete search history.

(56) References Cited

U.S. PATENT DOCUMENTS 4,663,580 A * 5/1987 Wortman ...................... 320/153

* cited by examiner

*Primary Examiner* — Stephen W Jackson
(74) *Attorney, Agent, or Firm* — Altis Law Group, Inc.

(57) ABSTRACT

A power protection circuit includes a power providing unit, a first and second voltage converters, a first and second switches, a first and second voltage detecting circuits, and a first and second warning circuits. The first switch connects between the power providing unit and the first voltage converter. The second switch connects between the power providing unit and the second voltage converter. The first and second voltage detecting circuits are respectively connected to the first and second voltage converters. The first and second warning circuits are respectively connected to the first and second voltage detecting circuits. When the input voltage of the first voltage detecting circuit drops, the first switch turns off the first voltage converter, the first warning circuit signals a warning; when the input voltage of the second voltage detecting circuit drops, the second switch turns off the second voltage converter, the second warning circuit signals a warning.

15 Claims, 2 Drawing Sheets

POWER PROTECTION CIRCUIT

BACKGROUND

1. Technical Field

The present disclosure relates to a power protection circuit.

2. Description of Related Art

Sometimes, when a component that is mounted on a circuit board malfunctions, current travelling in the circuit board may greatly increase or the circuit board may short-circuit. It may also result in electric shock or other accidents. In addition, it requires manual inspection and diagnostics for repairs of the component that is malfunctioning, which is time-consuming and inefficient.

Therefore, it is desirable to provide a power protection circuit which can overcome the above problems.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Embodiments of the present disclosure will now be described in detail below and with reference to the drawings.

Figure 1:
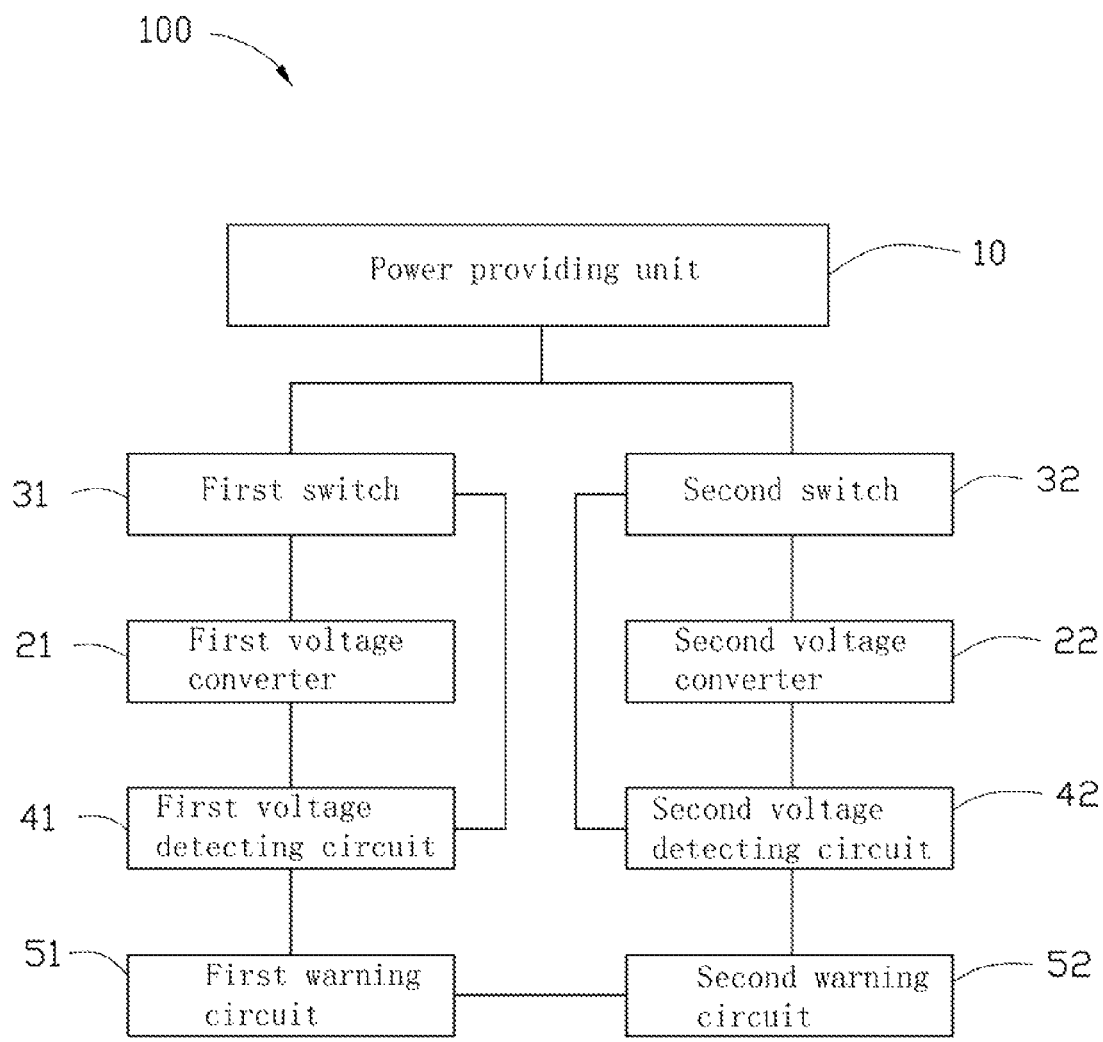
FIG. 1 is a functional block diagram of a power protection circuit in accordance to an exemplary embodiment.

Referring to FIG. 1, a power protection circuit 100, according to an exemplary embodiment, it is applied to a circuit board (not shown) (e.g., embodied as a portion of the circuit board) to protect the circuit board when one or more components of the circuit board malfunctions. The power protection circuit 100 includes a power providing unit 10, a first voltage converter 21, a second voltage converter 22, a first switch 31, a second switch 32, a first voltage detecting circuit 41, a second voltage detecting circuit 42, a first warning circuit 51, and a second warning circuit 52.

The power providing unit 10 is configured for providing power to the first voltage converter 21 and the second voltage converter 22. The first switch 31 is interconnected between the power providing unit 10 and the first voltage converter 21. The second switch 32 is interconnected between the power providing unit 10 and the second voltage converter 22. The first voltage detecting circuit 41 is electrically connected to the first voltage converter 21 and the first switch 31 and configured to detect whether or not the first voltage converter 21 is malfunctioning. The second voltage detecting circuit 42 is connected to the second voltage converter 22 and the second switch 32 and configured to detect whether or not the second voltage converter 22 is malfunctioning. The first warning circuit 51 is electrically connected to the first voltage detecting circuit 41 and the second warning circuit 52 is electrically connected to the second voltage detecting circuit 42. When the first voltage detecting circuit 41 detects that the first voltage converter 21 is malfunctioning, the first switch 31 turns off power supply for the first voltage converter 21 and actuates the first warning circuit 51 to warn user. When the second voltage detecting circuit 42 detects that the second voltage converter 22 is malfunctioning, the second switch 32 turns off power supply for the second voltage converter 22 and actuates the second warning circuit 52 to warn user.

It should be noted that the number of the groups of the voltage converter, switches, voltage detecting circuit, and the warning circuit are not limited to two, but can be any number depending on requirements.

Figure 2:
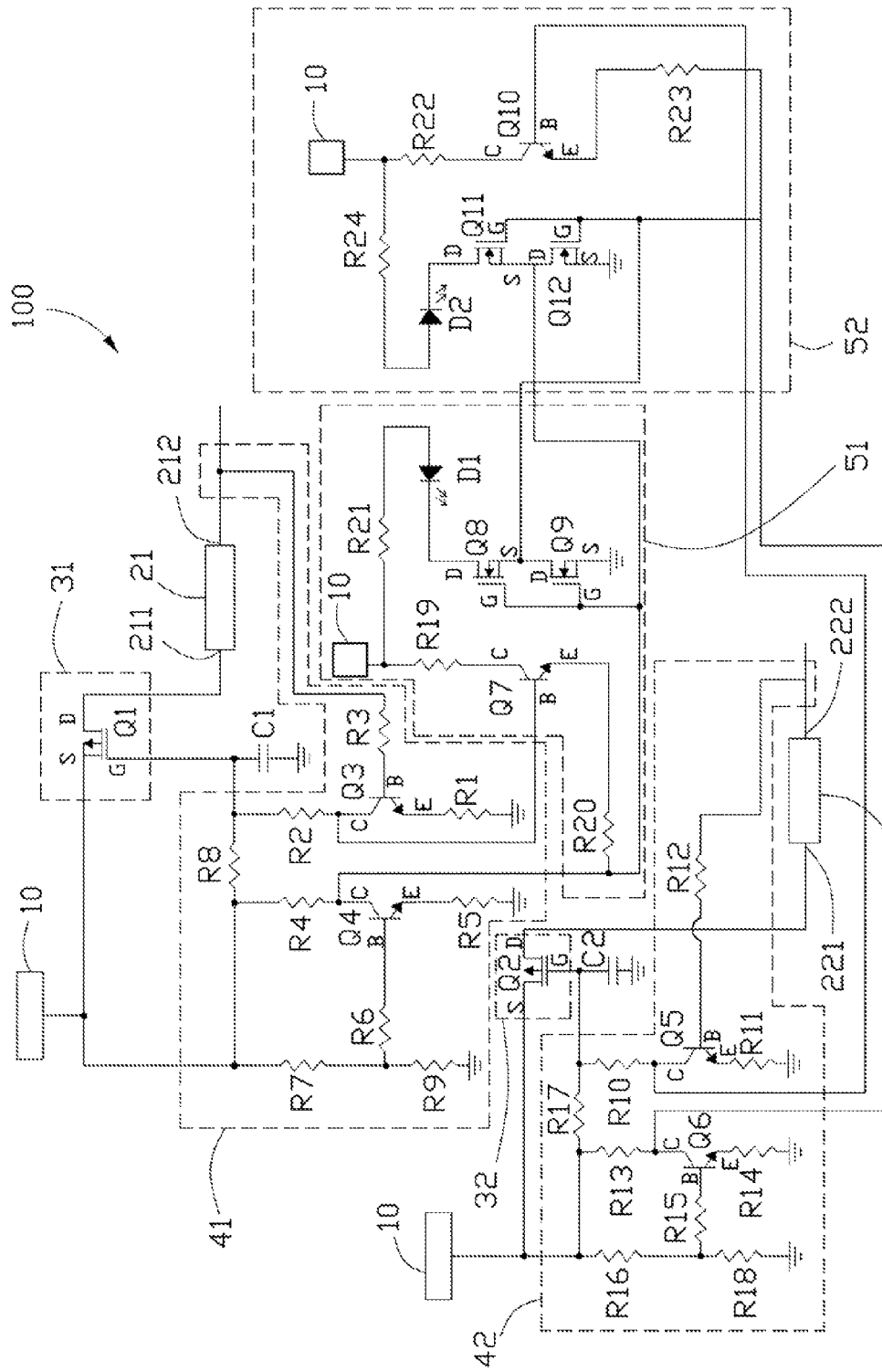
FIG. 2 is a circuit diagram of the power protection circuit of FIG. 1.

Also referring to FIG. 2, in the present embodiment, the power providing unit 10 is configured for a 12V power output. The first voltage converter 21 is configured for converting the 12V power output into a 5V power output. The second voltage converter 22 is configured for converting the 12V power output into a 3.3V power output. An output 212 of the first voltage converter 21 is electrically connected to one component (not shown), such as, a load, and an output 222 of the second voltage converter 22 is electrically connected to another component (not shown), such as, another load.

The first switch 31 includes a first transistor Q1. The second switch 32 includes a second transistor Q2. In the present embodiment, both the first switch 31 and the second switch 32 are PMOS transistors. The drain D of the first transistor Q1 is connected to an input 211 of the first voltage converter 21. The gate G of the first transistor Q1 is grounded by a first delay capacitance C1. The source S of the first transistor Q1 is connected to the power providing unit 10, and is also connected to the first voltage detecting circuit 41. The drain D of the second transistor Q2 is connected to an input 221 of the second voltage converter 22. The gate G of the second transistor Q2 is grounded by a second delay capacitance C2, and is also connected to the second voltage detecting circuit 42. The source S of the second transistor Q2 is connected to the power providing unit 10.

The first voltage detecting circuit 41 includes a third transistor Q3 and a fourth transistor Q4. In the present embodiment, both the third transistor Q3 and the fourth transistor Q4 are NPN transistors. The collector C of the third transistor Q3 is connected to the gate G of the first transistor Q1 by a resistor R2; the emitter E is grounded by a resistor R1; the base B is connected to an output 212 of the first voltage converter 21 by a resistor R3. The collector C of the fourth transistor Q4 is connected to the power providing unit 10 by a resistor R4; the emitter E is grounded by a resistor R5; the base B is grounded by two resistors R6 and R9. A resistor R8 is interconnected between the collector C of the third transistor Q3 and the collector C of the fourth transistor Q4. A resistor R7 is interconnected between the resistor R6 and the power providing unit 10.

The second voltage detecting circuit 42 includes a fifth transistor Q5 and a sixth transistor Q6. In the present embodiment, both the fifth transistor Q5 and the sixth transistor Q6 are NPN transistors. The collector C of the fifth transistor Q5 is connected to the gate G of the second transistor Q2 by a resistor R10; the emitter E is grounded by a resistor R11; the base B is connected to an output 222 of the second voltage converter 22 by a resistor R12. The collector C of the sixth transistor Q6 is connected to the power providing unit 10 by a resistor R13; the emitter E is grounded by a resistor R14; the base B is grounded by two resistors R15 and R18. A resistor R17 is interconnected between the collector C of the fifth transistor Q5 and the collector C of the sixth transistor Q6. A resistor R16 is interconnected between the resistor R15 and the power providing unit 10.

The first warning circuit 51 includes a seventh transistor Q7, a eighth transistor Q8, a ninth transistor Q9, and a first light-emitting diode D1. In the present embodiment, the seventh transistor Q7 is an NPN transistor. Both the eighth transistor Q8 and the ninth transistor Q9 are NMOS transistors. The base B of the seventh transistor Q7 is connected to the collector C of the third transistor Q3; the collector C of the seventh transistor Q7 is connected to the power providing unit 10 by a resistor R19; the emitter E of the seventh transistor Q7 is connected to the collector C of the fourth transistor Q4 by a resistor R20. Both gates G of the eighth transistor Q8 and the ninth transistor Q9 are connected to the collector C of the fourth transistor Q4. The source S of the eighth transistor Q8 is connected to the drain D of the ninth transistor Q9. The drain D of the eighth transistor Q8 is connected to the cathode of the first light-emitting diode D1. The source S of the ninth transistor Q9 is grounded. The anode of the first light-emitting diode D1 is connected to the power providing unit 10 by a resistor R21.

The second warning circuit 52 includes a tenth transistor Q10, an eleventh transistor Q11, a twelfth transistor Q12, and a second light-emitting diode D2. In the present embodiment, the tenth transistor Q10 is an NPN transistor. Both the eleventh transistor Q11 and the twelfth transistor Q12 are NMOS transistors. The base B of the tenth transistor Q10 is connected to the collector C of the fifth transistor Q5; the collector C of the tenth transistor Q10 is connected to the power providing unit 10 by a resistor R22; the emitter E of the tenth transistor Q10 is connected to the collector C of the sixth transistor Q6 by a resistor R23. Both gates G of the eleventh transistor Q11 and the twelfth transistor Q12 are respectively connected to a node formed between the source S of the eighth transistor Q8 and the drain D of the ninth transistor Q9. The source S of the eleventh transistor Q11 is connected to the drain D of the twelfth transistor Q12. The drain D of the eleventh transistor Q11 is connected to the cathode of the second light-emitting diode D2. The source S of the twelfth transistor Q12 is grounded. Both gates G of the eighth transistor Q8 and the ninth transistor Q9 are connected to a node formed between the source S of the eleventh transistor Q11 and the drain D of the twelfth transistor Q12. The anode of the second light-emitting diode D2 is connected to the power providing unit 10 by a resistor R24.

In use, when the component connected to the output 212 of the first voltage converter 21 malfunctions, the first voltage detecting circuit 41 detects a reduction in the input voltage of the base B of the third transistor Q3. The third transistor Q3 turns off, and the voltage of the gate G of the first transistor Q1 becomes higher, the first transistor Q1 also turns off. As such, the first voltage converter 21 stops work. At the same time, the seventh transistor Q7, the eighth transistor Q8, and the ninth transistor Q9 are all turned on, and the first light-emitting diode D1 emits light to emit a warning signal. Both gates G of the eleventh transistor Q11 and the twelfth transistor Q12 gain a low level voltage, the eleventh transistor Q11 and the twelfth transistor Q12 turn off, the second light-emitting diode D2 does not emit light.

When the component connected to the output 222 of the second voltage converter 22 malfunctions, the second voltage detecting circuit 42 detects a reduction in the input voltage of the base B of the fifth transistor Q5. The fifth transistor Q5 turns off, and the voltage of the gate G of the second transistor Q2 becomes higher, the second transistor Q2 also turns off. As such, the second voltage converter 22 stops work. At the same time, the sixth transistor Q6, the tenth transistor Q10, and the eleventh transistor Q11 are all turned on, and the second light-emitting diode D2 emits light to signal a warning. Both gates G of the eighth transistor Q8 and the ninth transistor Q9 gain a low level voltage, the eighth transistor Q8 and the ninth transistor Q9 turn off, the first light-emitting diode D1 does not emit light.

It will be understood that the above particular embodiments is shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A power protection circuit, comprising:
a power providing unit configured for providing power supply;
a first voltage converter;
a first switch interconnected between the power providing unit and the first voltage converter;
a second voltage converter;
a second switch interconnected between the power providing unit and the second voltage converter;
a first voltage detecting circuit connected to the first voltage converter and the first switch;
a second voltage detecting circuit connected to the second voltage converter and the second switch;
a first warning circuit connected to the first voltage detecting circuit; and
a second warning circuit connected to the second voltage detecting circuit;
wherein when the input voltage of the first voltage detecting circuit drops, the first switch turns off the first voltage converter, and the first warning circuit signals a warning; when the input voltage of the second voltage detecting circuit drops, the second switch turns off the second voltage converter, and the second warning circuit signals a warning.

2. The power protection circuit of claim 1, wherein the first switch comprises a first transistor, the second switch comprises a second transistor, when the input voltage of the first voltage detecting circuit drops, the first switch turns off the first voltage converter, when the input voltage of the second voltage detecting circuit drops, the second switch turns off the second voltage converter.

3. The power protection circuit of claim 2, wherein both the first switch and the second switch are PMOS transistors, the drain of the first transistor is connected to an input of the first voltage converter, the gate of the first transistor is grounded, the source of the first transistor is connected to the power providing unit, the drain of the second transistor is connected to an input of the second voltage converter, the gate of the second transistor is grounded, the source of the second transistor is connected to the power providing unit.

4. The power protection circuit of claim 3, wherein the first voltage detecting circuit comprises a third transistor and a fourth transistor, both the third transistor and the fourth transistor are NPN transistors, the collector of the third transistor is connected to the gate of the first transistor, the emitter of the third transistor is grounded, the base of the third transistor is connected to an output of the first voltage converter, the collector of the fourth transistor is connected to the power providing unit, the emitter of the fourth transistor is grounded, the base of the fourth transistor is grounded, the collector of the third transistor is connected to the collector of the fourth transistor.

5. The power protection circuit of claim 3, wherein the second voltage detecting circuit comprises a fifth transistor and a sixth transistor, both the fifth transistor and the sixth transistor are NPN transistors, the collector C of the fifth transistor is connected to the gate of the second transistor, the emitter of the fifth transistor is grounded, the base of the fifth transistor is connected to an output of the second voltage converter, the collector of the sixth transistor is connected to the power providing unit, the emitter of the sixth transistor is grounded, the base of the sixth transistor is grounded, the collector of the fifth transistor is connected to the collector of the sixth transistor.

6. The power protection circuit of claim 4, wherein the first warning circuit comprises a seventh transistor, a eighth transistor, a ninth transistor, and a first light-emitting diode, the seventh transistor is an NPN transistor, both the eighth transistor and the ninth transistor are NMOS transistors, the base of the seventh transistor is connected to the collector of the third transistor, the collector of the seventh transistor is connected to the power providing unit, the emitter of the seventh transistor is connected to the collector of the fourth transistor, both gates of the eighth transistor and the ninth transistor are connected to the collector of the fourth transistor, the source of the eighth transistor is connected to the drain of the ninth transistor, the drain of the eighth transistor is connected to the cathode of the first light-emitting diode, the source of the ninth transistor is grounded, the anode of the first light-emitting diode is connected to the power providing unit.

7. The power protection circuit of claim 5, wherein the second warning circuit comprises a tenth transistor, an eleventh transistor, a twelfth transistor, and a second light-emitting diode, the tenth transistor is an NPN transistor, both the eleventh transistor and the twelfth transistor are NMOS transistors, the base of the tenth transistor is connected to the collector of the fifth transistor, the collector of the tenth transistor is connected to the power providing unit, the emitter of the tenth transistor is connected to the collector of the sixth transistor, both gates of the eleventh transistor and the twelfth transistor are respectively connected to an node formed between the source of the eighth transistor and drain of the ninth transistor, the source of the eleventh transistor is connected to the drain of the twelfth transistor, the drain of the twelfth transistor is connected to the cathode of the second light-emitting diode, the source of the twelfth transistor is grounded, the anode of the second light-emitting diode is connected to the power providing unit.

8. The power protection circuit of claim 3, wherein the gate of the first transistor is grounded by a first delay capacitance.

9. The power protection circuit of claim 3, wherein the gate of the second transistor is grounded by a second delay capacitance.

10. A power protection circuit, comprising:
a power providing unit configured for providing power supply;
a voltage converter;
a switch interconnected between the power providing unit and the voltage converter;
a voltage detecting circuit connected to the voltage converter and the switch; and
a warning circuit connected to the voltage detecting circuit;
wherein when the input voltage of the voltage detecting circuit drops, the switch turns off the voltage converter, and the warning circuit signals a warning.

11. The power protection circuit of claim 10, wherein the switch comprises a transistor, when the input voltage of the voltage detecting circuit drops, the switch turns off the voltage converter.

12. The power protection circuit of claim 11, wherein the switch is PMOS transistor, the drain of the transistor is connected to an input of the voltage converter, the gate of the transistor is grounded, the source of the transistor is connected to the power providing unit.

13. The power protection circuit of claim 12, wherein the voltage detecting circuit comprises a first transistor and a second transistor, both the first transistor and the second transistor are NPN transistors, the collector of the first transistor is connected to the gate of the PMOS transistor, the emitter of the first transistor is grounded, the base of the first transistor is connected to an output of the voltage converter, the collector of the second transistor is connected to the power providing unit, the emitter of the second transistor is grounded, the base of the second transistor is grounded, the collector of the first transistor is connected to the collector of the second transistor.

14. The power protection circuit of claim 13, wherein the warning circuit comprises a third transistor, a fourth transistor, a fifth transistor, and a light-emitting diode, the third transistor is an NPN transistor, both the fourth transistor and the fifth transistor are NMOS transistors, the base of the third transistor is connected to the collector of the first transistor, the collector of the third transistor is connected to the power providing unit, the emitter of the third transistor is connected to the collector of the second transistor, both gates of the fourth transistor and the fifth transistor are connected to the collector of the second transistor, the source of the fourth transistor is connected to the drain of the fifth transistor, the drain of the fourth transistor is connected to the cathode of the light-emitting diode, the source of the fifth transistor is grounded, the anode of the light-emitting diode is connected to the power providing unit.

15. The power protection circuit of claim 12, wherein the gate of the PMOS transistor is grounded by a delay capacitance.

\* \* \* \* \*